(12) United States Patent
Schmidt

(10) Patent No.: US 11,294,332 B2
(45) Date of Patent: Apr. 5, 2022

(54) CONSUMABLE COMPONENT IDENTIFIERS

(71) Applicant: HEWLETT-PACKARD DEVELOPMENT COMPANY, L.P., Spring, TX (US)

(72) Inventor: Wayne J Schmidt, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/499,305

(22) PCT Filed: Apr. 23, 2018

(86) PCT No.: PCT/US2018/028835
§ 371 (c)(1),
(2) Date: Sep. 29, 2019

(87) PCT Pub. No.: WO2019/209243
PCT Pub. Date: Oct. 31, 2019

(65) Prior Publication Data
US 2021/0333751 A1  Oct. 28, 2021

(51) Int. Cl.
*G03G 15/00* (2006.01)
*G03G 21/18* (2006.01)

(52) U.S. Cl.
CPC ....... *G03G 21/1896* (2013.01); *G03G 15/553* (2013.01); *G03G 21/1889* (2013.01)

(58) Field of Classification Search
CPC ............. G03G 15/553; G03G 21/1889; G03G 21/1892; G03G 21/1896
USPC .......................................................... 399/12
See application file for complete search history.

(56) References Cited

U.S. PATENT DOCUMENTS

| | | | |
|---|---|---|---|
| 6,240,262 B1* | 5/2001 | Taniyama et al. ........................... | G03G 15/0863 399/12 |
| 6,301,449 B1* | 10/2001 | Miura ................ | G03G 15/5079 399/12 |
| 6,605,399 B2* | 8/2003 | Chowdry et al. ........ | G03G 5/04 399/159 |
| 8,218,195 B2 | 7/2012 | Lapstun et al. | |
| 2003/0124445 A1* | 7/2003 | Sugimura et al. ... | G03G 15/751 399/12 |
| 2004/0020382 A1 | 2/2004 | Mclean et al. | |
| 2004/0181681 A1 | 9/2004 | Salisbury | |
| 2004/0257601 A1 | 12/2004 | Tomiyasu et al. | |
| 2007/0279647 A1 | 12/2007 | Shinyama | |
| 2009/0134225 A1 | 5/2009 | Koike et al. | |
| 2010/0086330 A1* | 4/2010 | Nakano ..................... | G03G 5/10 399/159 |
| 2011/0129238 A1 | 6/2011 | Muranaka | |
| 2012/0008995 A1 | 1/2012 | Shigemura et al. | |
| 2013/0108282 A1 | 5/2013 | Sonoda et al. | |

(Continued)

FOREIGN PATENT DOCUMENTS

GB   2485888 B   6/2017
RU   2446056 C2  3/2012

*Primary Examiner* — William J Royer
(74) *Attorney, Agent, or Firm* — HP Inc. Patent Department

(57) ABSTRACT

An example print device may comprise a consumable component comprising a human-indiscernible hardware-based identifier. The example print device may also comprise a sensor to read the human-indiscernible hardware-based identifier.

16 Claims, 5 Drawing Sheets

(56) References Cited

U.S. PATENT DOCUMENTS

2016/0342110 A1 11/2016 Luke
2021/0055681 A1* 2/2021 Schmidt ................ G03G 15/75

* cited by examiner

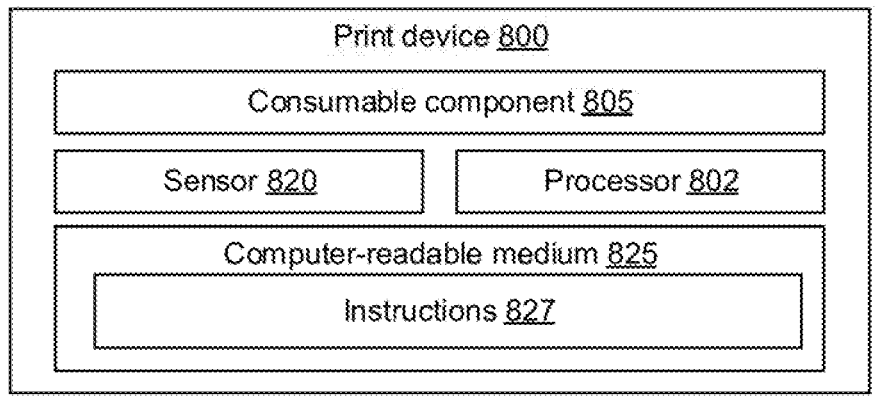
FIG. 8
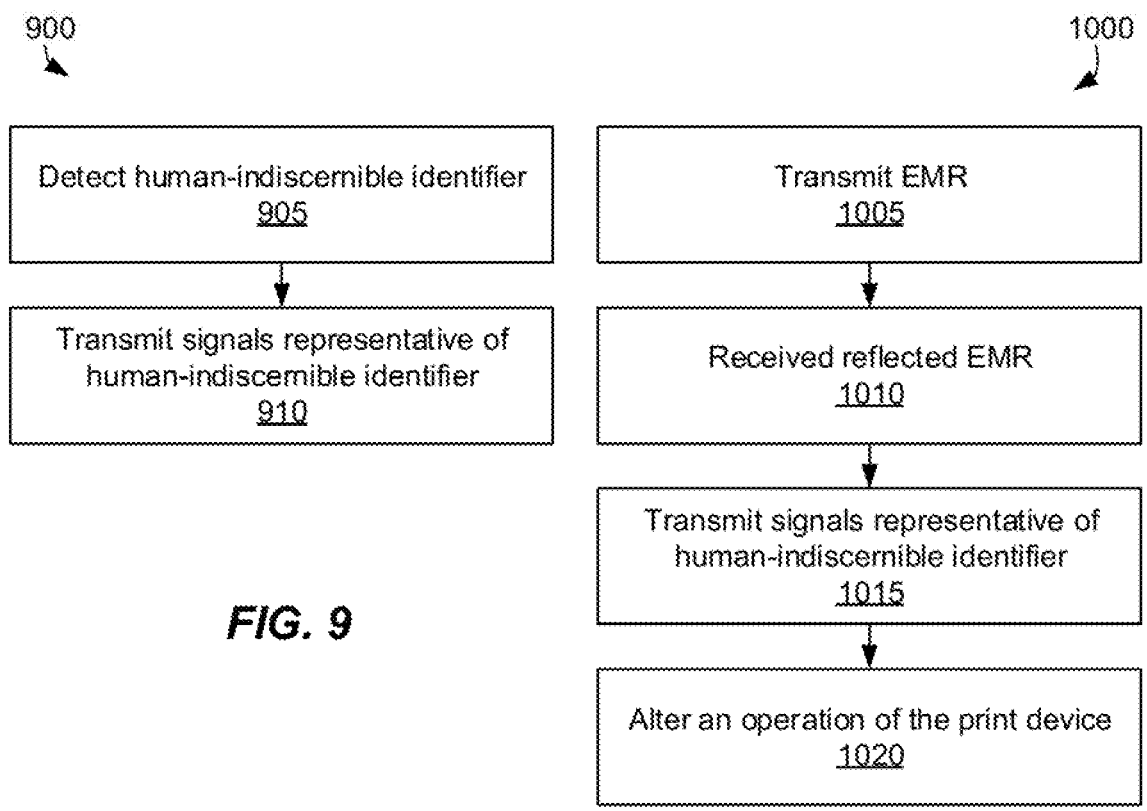
FIG. 9
FIG. 10

CONSUMABLE COMPONENT IDENTIFIERS

BACKGROUND

At times, components of a print device for forming markings on a print target, such as print media in the case of a two-dimensional (2D) printer and a bed of build material in the case of a three-dimensional (3D) printer, may be replaceable. For instance, some components, referred to herein interchangeably as consumable print device components and consumable components, may last for a duration that is less than that of the print device.

BRIEF DESCRIPTION OF THE DRAWINGS

Various examples will be described below by referring to the following figures.

FIG. 8 is a block diagram of an example print device;

FIG. 9 is a flow diagram of an example method of detecting a human-indiscernible hardware-based identifier; and FIG. 10 is a flow diagram of an example method of altering an operation of a print device.

Figure 1A:
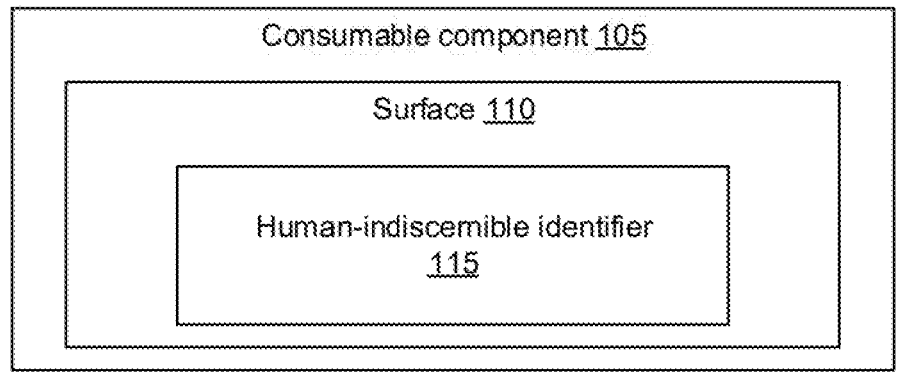
FIGS. 1A and 1B are block diagrams that illustrate example consumable components having human-indiscernible identifiers.
Figure 1B:
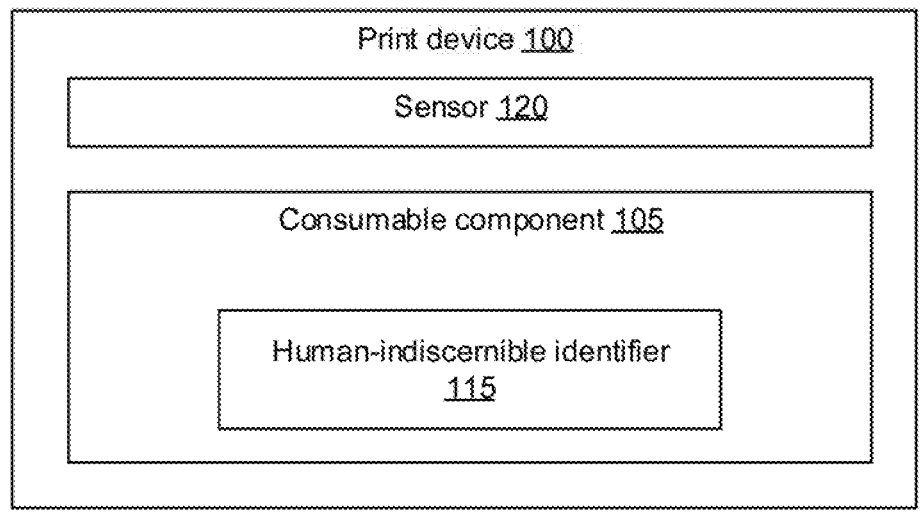

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Devices, such as print devices capable of forming markings, including images and text, on a print medium may comprise components that may be replaceable, such as to prolong the life of the device. By way of non-limiting example, some print devices may form markings using electrophotography and/or by fusing print substances to print media. The act of forming markings on print media using such electrophotographic print devices may exhaust print substances (e.g., toner and carrier), may wear out components that contact print media and/or other print device components (e.g., an intermediate transfer belt, an organic photoconductor (OPC) drum, etc.), and may otherwise lead to replacement of components. Replacement of components is not restricted to electrophotographic print devices, however. Print devices that use thermal resistors or piezoelectric elements to eject print substance from nozzles towards print media also include replaceable components including, but not limited to, printheads, print cartridges, and print substance reservoirs. Also, some print devices use liquid print substances and electrophotographic print drums and members to form markings on print media using "wet," as opposed to "dry" electrophotographic techniques. By way of further non-limiting example, some three-dimension (3D) print devices also comprise components that may call for replacement during the life of the device.

As used herein, replaceable device components, such as the example print device components discussed in the foregoing, are referred to as "consumable components." The following discussion will focus on several example consumable components, such as an OPC drum and a bar of printheads, however these examples are not to be taken in a limiting sense.

Indeed, claimed subject matter is intended to extend to other possible consumable components.

With the foregoing in mind, there may be a desire to ensure a minimum quality of a consumable component. For example, a replacement consumable component of a quality that is lower than that of an original consumable component may yield prints of lower quality, such as than prints of original consumable components. Firmware of the print device may also be incompatible with certain replacement consumable components resulting in improper operation of the device and, potentially, leading to damage of the print device. There may be a desire, therefore, to authenticate consumable components. As used herein, authentication refers to mechanisms and/or processes to determine a source and/or identity of a consumable component and confirm that the determined source and/or identity correspond to authorized sources and/or identities. Consequently, failure to determine a source and/or an identity of a consumable component may result in a determination that the consumable component is not authorized. Similarly, failure to confirm that a determined source and/or identity correspond to authorized sources and/or identities may also result in a determination that the consumable component is not authorized. In addition to a potential interest in authentication, there may be an interest in using an identifier indicative of identity and/or source to enable tracking of consumable components. By way of illustration, by tracking consumable components based on identifiers (e.g., unique identifiers), it may be possible to, for example, track consumable components based on material, material attributes, etc. Furthermore, tracked attributes and characteristics may be useful to provide altered device operation (e.g., selecting print characteristics based on material attributes). By way of example, tracked attributes and characteristics may, in some cases, provide a future method of tuning a print device, such as for enhanced use of a consumable with a special attribute.

Some forms of consumable component identification and/or authentication include the use of a computer-readable medium coupled to a consumable component. As used herein, the term computer-readable medium refers to various forms of memory-storing devices including, but not limited to, volatile and non-volatile memory. For example, resistive memory, flash memory, magnetic memory, phase change memory, and the like, are examples of possible computer-readable media contemplated by claimed subject matter. Returning to the discussion of authenticating a consumable component, the computer-readable medium may be communicably coupled to an integrated circuit (IC) on the consumable component, for example. The computer-readable medium may comprise a non-volatile medium, such as to store signals or states to enable authentication of the consumable component. However, in spite of security precautions including encryption of the data stored on the computer-readable medium, at times, manufacturers of unauthorized consumable components may nevertheless be able to copy the data stored in the computer-readable medium and/or the IC in order to forge a source and/or an identity and trick print devices into authenticating consumable components of low quality. As a result, users may unknowingly install consumable components that may cause damage—sometimes permanent—to the print device. There may be a desire, therefore, for additional mechanisms for enabling authentication of consumable components, such as in addition to the use of signals and/or states stored in computer-readable media.

Another mechanism for enabling identification and/or authentication of consumable components is the use of a hardware-based identifier. Hardware-based identifiers may include alphanumeric characters, shapes, colors, or combinations thereof, arranged on a consumable component. Hardware-based identifiers are distinguished from identifiers stored as signals and/or states in a computer-readable medium of a consumable component. Thus, for example, a serial number or bar code printed on a consumable component is a hardware-based component, while a serial number encoded in a computer-readable medium of an IC connected to a consumable component is not.

However, there may be an interest in providing a hardware-based component that may not be readily apparent to, for example, those seeking to sell low quality consumable components. For instance, there may be an interest in identifiers that are not readily visible or determinable by a human without the aid of a computer or viewing mechanism. As used herein, the term "human-indiscernible" in the context of identifiers is used to refer to identifiers that are imperceptible to humans without the aid of some form of viewing mechanism or apparatus. For example, possible human-indiscernible identifiers may comprise identifiers that are invisible in the visible light spectrums (e.g., approximately 400 nm to approximately 700 nm), identifiers that are obscured under some material, identifiers that are expressed as a pattern that may not be readily perceived by a user (e.g., a pattern hidden in an arrangement of circuit elements or apparent circuit elements), identifiers too small to be seen by a human without a visual assistance aid, and/or identifiers encoded as an alphanumeric value string.

Consequently, there may be an interest in using human-indiscernible hardware-based identifiers to enable authentication of consumable components.

With the foregoing in mind, an example consumable component 105 is illustrated in FIG. 1A comprising a surface 110 and a human-indiscernible identifier 115. Human-indiscernible identifier 115 may comprise a unique identifier, such as a serial number corresponding to a particular consumable component 105. Human-indiscernible identifier 115 may comprise a portion corresponding to a particular source, such as a particular manufacturing facility, and another portion corresponding to the particular consumable component (as opposed to other consumable components of the same type). Thus, an example human-indiscernible identifier may comprise a first alphanumeric portion, such as ABCD, by way of example, indicative of a source, such as a factory in a particular city, state, province, and/or country. The human-indiscernible identifier may comprise a second alphanumeric portion, such as 1234, by way of example, indicative of a type of consumable component (e.g., a capacity of print substance, a model number, etc.). The human-indiscernible identifier may comprise a third alphanumeric portion, such as XY89, by way of example, corresponding to a particular consumable component. Further, at times the human-indiscernible identifier may comprise yet another portion, such as 0099 that may correspond to a distinguishable capability and/or improvement (e.g., a different photoconductive coating for which power and/or bias control may be adjusted). The human-indiscernible identifier (e.g., ABCD1234XY890099) may be used to confirm a source and identity of a consumable component. Of course, the foregoing is merely presented by way of illustration and is not intended to be taken in a limiting sense. Additionally, identifiers may take the form of combinations of lines, shapes, and/or colors such as bar codes and the like, without limitation.

Human-indiscernible identifier 115 may be arranged on surface 110 of consumable component 105. For example, if consumable component 105 is a print cartridge including a printhead, human-indiscernible identifier 115 may be etched into an external surface of the print cartridge and/or printhead and covered with a material, printed with a print substance that is visible in limited light spectrums, or embodied in a pattern that may not be identifiable to humans without the use of a viewing apparatus, by way of example. In one case, for example, the identifier may be arranged on surface 110 of consumable component 105 and covered with a material that is opaque in visible light, but that may allow light of certain spectrums, such as infrared (IR) spectrums (e.g., approximately 700 nm to approximately 1 mm) to traverse.

Thus, with the foregoing in mind, a consumable component 105, such as a consumable component for a print device, may comprise a surface 110, and a human-indiscernible hardware-based identifier 115 arranged on surface 110. The human-indiscernible identifier may be usable to authenticate consumable component 105. Surface 110 may comprise an electrically-conductive material, such as a metal or a metalloid. And human-indiscernible hardware-based identifier 115 may be etched in surface 110. In one implementation, upon installation of consumable component 105, a device may use human-indiscernible hardware-based identifier 115 to determine an identity and/or source of consumable component 105.

As shall be discussed in relation to FIG. 18, consumable component 105 may be used within a print device 100.

FIG. 18 illustrates a print device 100 having a consumable component 105 with a human-indiscernible identifier 115 arranged thereon. A sensor 120 may be used to detect human-indiscernible identifier 115, among other things (e.g., sensor 120 may have other functions, such as an edge sensor, for page registration, etc.). Sensor 120 may be capable of sensing electromagnetic radiation (referred to hereinafter as EMR), such as within ultraviolet, visible, or infrared spectrums, by way of example. Example sensors may include optical receivers and optical transceivers, without limitation. Sensor 120 may be arranged with respect to consumable component 105 to enable identifying and reading (e.g., determining) a human-indiscernible hardware-based identifier 115 arranged on consumable component 105. For example, if human-indiscernible hardware-based identifier 115 is arranged under a layer of material, sensor 120 may be arranged in proximity to human-indiscernible hardware-based identifier 115 to enable detection thereof. For instance, in a case in which consumable component 105 comprises an OPC drum, sensor 120 may be arranged in proximity to the OPC drum (e.g., within a developer unit) or may be arranged in proximity to an intermediate transfer belt. If sensor 120 is arranged in proximity to the OPC drum, then it may be that sensor 120 can read human-indiscernible hardware-based identifier 115 directly. On the other hand, if sensor 120 is arranged in proximity to the intermediate transfer belt, it may be that sensor 120 can read a latent image representing human-indiscernible hardware-based identifier 115 on the intermediate transfer belt. It is noted that this description refers to detecting human-indiscernible hardware-based identifiers to describe detecting human-indiscernible hardware-based identifiers directly, detecting a latent image of a human-indiscernible hardware-based identifier, and/or detecting a reflection of a human-indiscernible hardware-based identifier, without limitation.

Of course, the foregoing is presented merely by way of example. And claimed subject matter is not intended to be narrowly construed to the examples discussed. Indeed, claimed subject matter contemplates a print device (e.g., print device 100) comprising a consumable component (e.g., consumable component 105) comprising a human-indiscernible hardware-based identifier (e.g., human-indiscernible hardware-based identifier 115), and a sensor (e.g., sensor 120) to read the human-indiscernible hardware-based identifier, without limitation.

The example of a human-indiscernible hardware-based identifier arranged on an OPC drum is further discussed with reference to FIGS. 2-6. An alternative example of a human-indiscernible hardware-based identifier in the context of a print bar is discussed with reference to FIG. 7. As shall be understood, human-indiscernible hardware-based identifiers may be used in a number of example consumable components, of which the present description presents but a few non-limiting illustrative examples.

Figure 2:
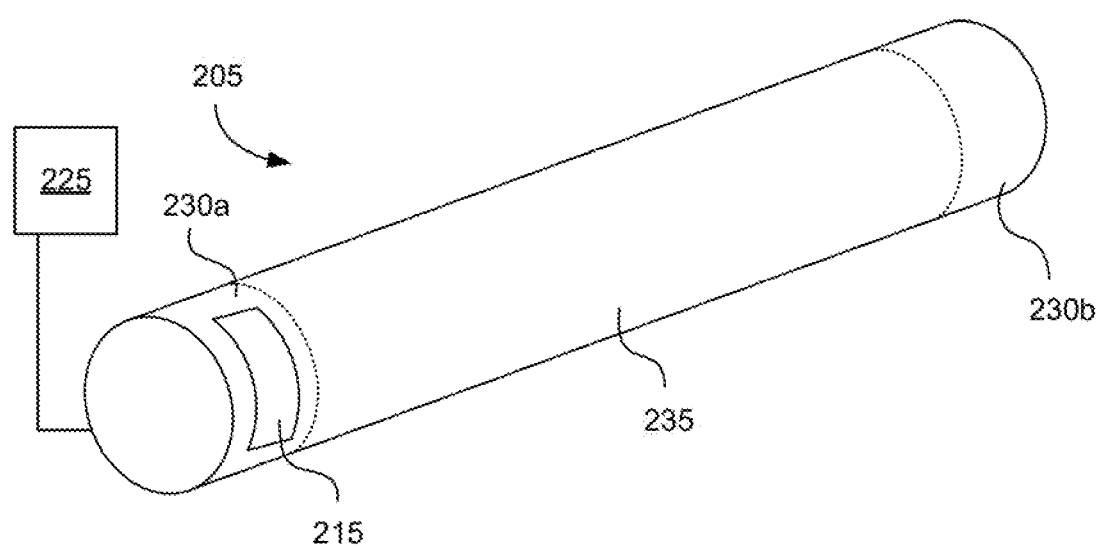
FIG. 2 is a perspective view of an example organic photoconductor drum.
Figure 3:
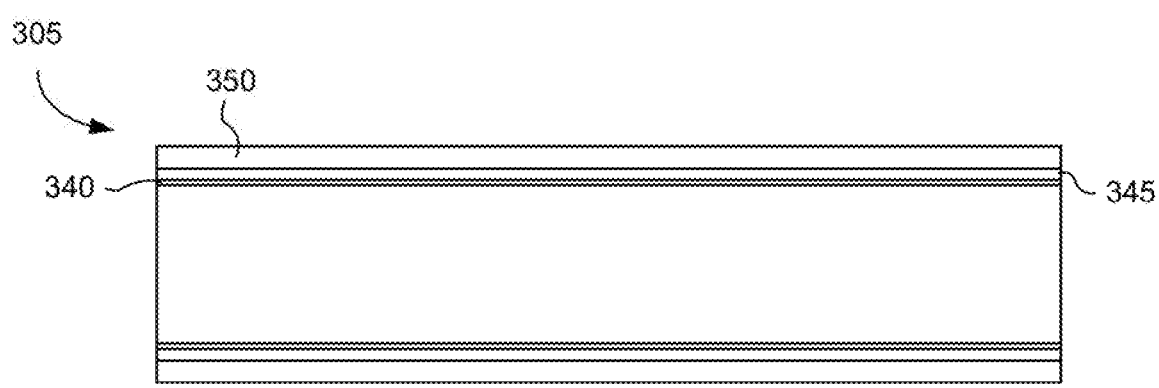
FIG. 3 is a cross section of an example organic photoconductor drum.

Turning to FIG. 2, an example consumable component 205 (referred to alternatively as OPC drum 205 in the context of FIG. 2) is illustrated from a perspective view. OPC drum 205 may be cylindrical in form. Turning to FIG. 3, which is a cross section of an example OPC drum to show possible construction thereof, OPC drum 305 in FIG. 3 is shown having a cylindrical substrate 340. Cylindrical substrate 340 may be electrically-conductive, such as comprising a metal or metalloid. Example substrate materials include, but are not limited to aluminum, titanium, tin, copper, palladium, and indium, by way of non-limiting example.

An undercoat layer 345 is illustrated on cylindrical substrate 340. Undercoat layer 345 may comprise a smoothing layer comprising materials to enable a relatively smooth and even profile, by way of example. Example materials for undercoat layer 345 may include resins, such as polyamides, polyesters, melamines, and the like. Other example materials may include metal oxides, such as aluminum oxide, titanium oxide, tin oxide, copper oxide, palladium oxide, and indium oxide, by way of non-limiting examples. As noted, there may be a desire that undercoat layer 345 provide a uniform profile. In cases in which a human-indiscernible hardware-based identifier has been arranged on substrate 340 (e.g., etched, deposited, etc.), undercoat layer 345 may be deposited such as to ensure a relatively smooth and even profile. For example, undercoat layer 345 may be used to avoid bulges in the photoconductive surface directly above the human-indiscernible hardware-based identifier. It is noted that in some cases, satisfactory photoconductive properties and/or a satisfactorily uniform profile may be achieved without undercoat layer 345.

A photoconductive layer 350 is illustrated surrounding undercoat layer 345. In some cases, photoconductive layer 350 may include multiple layers of different materials. For example, in one example (e.g., for a negative charge multilayer OPC drum), photoconductive layer 350 may comprise a charge generation layer (CGL) such as may comprise charge generation materials, and a charge transport layer (CTL) such as may comprise hole transport materials (which may be considered a type of a charge generation material). In another example, a single photoconductive layer may be deposited on undercoat layer 345, the single photosensitive layer comprising an electron transport material of some type. For CGLs, example materials may include polyvinyl acetates and polyketals, by way of example. Charge generation materials may include phtalocyanines and azos, by way of example. For CTLs, example materials may include polycarbonates, polyesters, and polystyrenes. Electron transport materials may include azoquinons. And hole transport materials may include arylamines, hydrazones, stilbenes, and benzidines.

Due, among other things, to a uniform profile, as enabled by undercoat layer 345, photoconductive layer 350 may also have a uniform profile. For example, as noted above, undercoat layer 345 may be deposited over a human-indiscernible hardware-based identifier in such a manner as to ensure a relatively smooth and even profile. And photoconductive layer 350, when deposited thereon, may also have a relatively smooth and even profile.

Of course, this is but one example construction of an OPC drum. It is noted that for clarity the claims and portions of the present description may refer to a photoconductive layer that is about a substrate (potentially with more or fewer layers) using the terminology "deposited about" the substrate.

Figure 4:
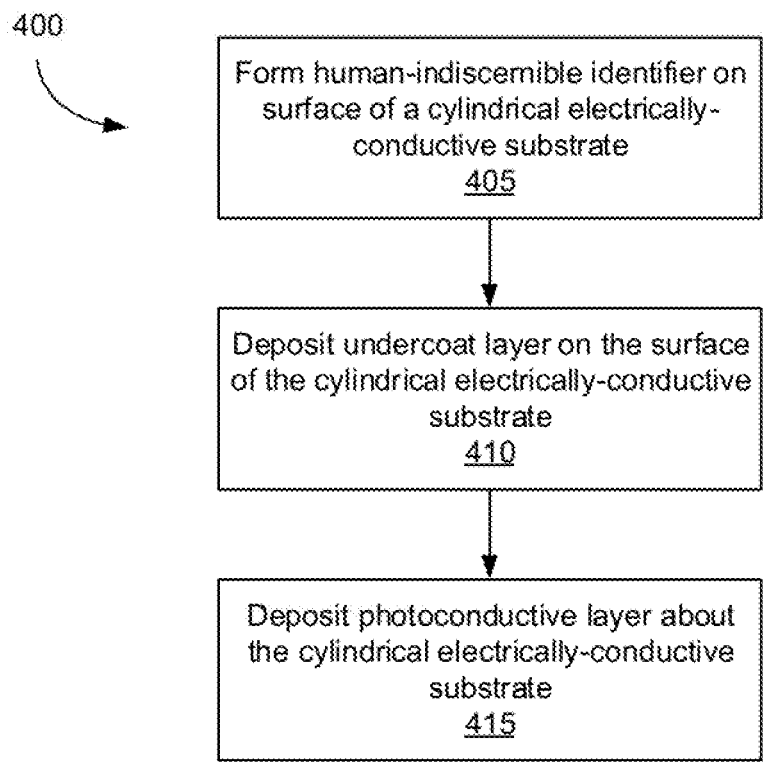
FIG. 4 is a flow diagram of an example method of arranging a human-indiscernible identifier on a consumable component.

Turning now to FIG. 4, an example method 400 for manufacturing an OPC drum (e.g., OPC drum 205 in FIG. 2) is illustrated to provide an example of one process that may be used to arrange a human-indiscernible hardware-based identifier on a consumable component.

As shown, at block 405 a human-indiscernible identifier (e.g., human-indiscernible identifier 215 in FIG. 2) is formed on a surface of a cylindrical electrically-conductive substrate (e.g., cylindrical substrate 340 in FIG. 3). In one case, the human-indiscernible identifier may be etched in the cylindrical electrically-conductive substrate. In another case, the human-indiscernible identifier may be deposited or placed on the substrate, such as by using a printing process like lithography or photolithography, by way of example. In such a case, the human-indiscernible identifier may be such that a characteristic, such as the conductivity, of the substrate and/or photoconductive layer may differ as compared to cases in which no human-indiscernible identifier is present. By way of example, the layer of photoconductive material (e.g., photoconductive layer 350) may be slightly thicker above an etched human-indiscernible identifier. Thus, conductivity in a region above the human-indiscernible identifier may be different (e.g., less) than in surrounding regions. In another case in which a human-indiscernible identifier is deposited about a substrate, the photoconductive layer may be thinner in a region above the human-indiscernible identifier than in surrounding regions. Thus, the conductivity in the region above the human-indiscernible identifier may be different than in the surrounding regions (e.g., greater). Furthermore, the human-indiscernible identifier may alter the conductive characteristics of the conductive substrate upon which it is arranged. In these example cases, and others, therefore, the human-indiscernible hardware-based identifier may enable formation of a latent image on the photoconductive layer, the latent image corresponding to the human-indiscernible hardware-based identifier. For instance, if the human-indiscernible hardware-based identifier comprises alphanumerical characters, a latent image of those alphanumerical characters may form on the photoconductive layer.

At block 410, an undercoat layer (e.g., undercoat layer 345 in FIG. 3) may be deposited about the surface of the cylindrical electrically-conductive substrate. As discussed above, the undercoat layer may provide a uniform profile. At block 415, a photoconductive layer may be deposited about the cylindrical electrically-conductive substrate, such as upon the undercoat layer. It is noted that claimed subject matter is not intended to be narrowly construed as to solely apply to such example OPC drums. For instance, in another case, substrate 340 may not be electrically conductive. In another case, OPC drum 305 may not comprise an undercoat layer, by way of example.

Returning to FIG. 2, it is noted that example OPC drum 205 may comprise a number of regions or portions. For example, peripheral portions 230a and 230b represent areas that may not be used to transfer markings to a print medium. In contrast, imaging portion 235 corresponds to an area of OPC drum 205 on which latent images may be formed for transfer to a print medium. There may be interest, therefore, in arranging human-indiscernible hardware-based identifiers, such as human-indiscernible hardware-based identifier 215, in peripheral portions 230a and/or 230b, such as to not interfere with marking a print medium. For example, human indiscernible identifier 215 may be arranged on the cylindrical substrate of OPC drum 205 in a peripheral portion, such as peripheral portion 230a as shown in FIG. 2.

Identifying human-indiscernible identifier 215 in a peripheral portion of a consumable component, such as in peripheral portions 230a and/or 230b, may be enabled by placing sensors in proximity to the consumable component. For instance, if OPC drum 205 is part of a developer unit, a sensor may be placed in proximity to OPC drum 205 (e.g., within the developer unit). And latent images of the human-indiscernible identifier may be detected using the sensor. In another case, rather than sensing a latent image of the human-indiscernible identifier directly on a consumable component, it may be possible to sense the latent image on an intermediate transfer belt, such as within a portion of the intermediate transfer belt corresponding to peripheral portions 230a and/or 230b. For instance, portions of the intermediate transfer belt may not contact print media, but latent images may be formed thereon, such as for color registration. In addition, latent images of human-indiscernible identifiers, such as from multiple developer units, may be transferred to the intermediate transfer belt for detection by a sensor arranged in proximity thereto. For example, sensors that are used for color registration may also be capable of detecting latent images of human-indiscernible identifiers. Such functionality will be discussed in greater detail hereinafter in relation to FIGS. 5 and 6.

FIG. 2 also shows an example computer-readable medium 225. Computer-readable medium 225 is shown connected to OPC drum 205 and signals or states may be stored thereon. In one example case, signals or states stored in computer-readable medium 225 may be used in conjunction with human-indiscernible hardware-based identifier 215 to enable authentication of OPC drum 205. By way of example, signals or states stored in computer-readable medium 225 may be compared with human-indiscernible identifier 215 as part of an authentication process. As discussed above, computer-readable medium 225 may be part of an IC and may have contacts to enable communication with a processor of a print device (e.g., print device 100 in FIG. 18). Such functionality will be discussed in greater detail hereinafter in relation to FIGS. 8-10.

With the foregoing in mind, therefore, in one implementation an OPC drum (e.g., OPC drum 205) may comprise a cylindrical substrate (e.g., substrate 340 in FIG. 3), a human-indiscernible hardware-based identifier (e.g., human-indiscernible hardware-based identifier 215) arranged on the surface of the cylindrical substrate, and a photoconductive layer arranged about the cylindrical substrate. As noted, the cylindrical substrate may comprise aluminum in one example, and the human-indiscernible hardware-based identifier may be etched into the substrate. A layer of material (e.g., undercoat layer 345 and/or photoconductive layer 350 from FIG. 3) may be arranged over the human-indiscernible hardware-based identifier. And further, as noted, in one example case, forming of the human-indiscernible hardware-based identifier on the substrate may be such as to not affect a profile of the layer of material arranged thereover. For instance, the OPC drum may be formed to have a substantially uniform profile, such as due to deposition of an undercoat layer and/or a photoconductive layer. The profile of the OPC drum may not have concave or convex regions, such as bulges or indentations, by way of example.

Figure 5:
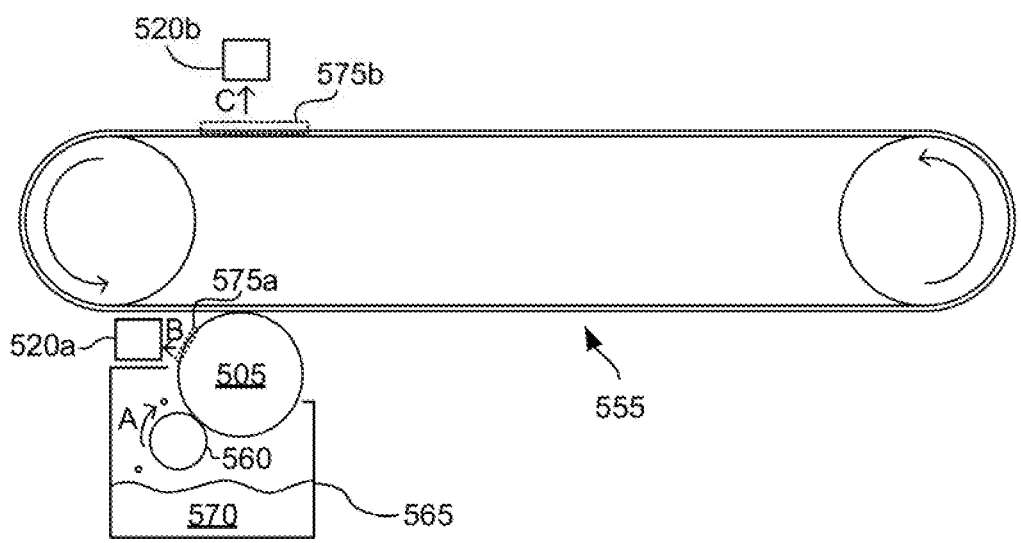
FIG. 5 is profile view of an example system for detecting a human-indiscernible hardware-based identifier.

FIG. 5 illustrates a system capable of sensing a human-indiscernible hardware-based identifier on a consumable component, such as OPC drum 505. In one example, OPC drum 505 may have a human-indiscernible hardware-based identifier (e.g., 215 in FIG. 2). OPC drum 505 may be integrated in a developer unit 565, which may hold a print substance, such as toner 570 (and carrier, in some cases). Developer unit 565 may also include a developer roller 560 to enable transfer of toner 570 to OPC drum 505, such as illustrated by the dots of toner and arrow A. Due, for instance, to charges on the surface of OPC drum 505, toner 570 may be attracted to OPC drum 505, such as in response to electromagnetic interactions (e.g., forces) between charged particles and/or surfaces. Toner 570 may form a latent image, as shown by the broken line square 575a, on OPC drum 505. Latent image 575a may correspond, for example, to a human-indiscernible hardware-based identifier. In one case, for example, toner 570 may be attracted to a surface of OPC drum 505 to form a human-indiscernible identifier. In another case, toner may not be attracted to the surface of OPC drum 505 to form a negative of the human-indiscernible identifier. Etc.

A sensor 520a may be arranged in relation to OPC drum 505 and/or developer unit 565 in order to detect latent image 575a. Arrow B is illustrative of EMR travelling from latent image 575a to sensor 520a. In one case, for example, sensor 520a may comprise an optical transceiver capable of transmitting EMR to a surface of OPC drum 505 and receiving reflected EMR back, as illustrated by arrow B. In another implementation, the system may comprise multiple developer units, such as similar to developer unit 565, and multiple sensors, such as sensor 520a.

Latent image 575a may be transferred to intermediate transfer belt 555, which may be conveyed by rollers, as shown in FIG. 5. For example, once transferred from OPC drum 505, latent image 575a may travel until in proximity to a second sensor 520b, as shown, which may be arranged relative intermediate transfer belt 555 to detect latent image 575b. Latent image 575b represents a latent image that may comprise, in addition to latent image 575a, latent images (of human-indiscernible hardware-based identifiers) of other developer units (not shown). For example, in one implementation a print device may include a separate developer unit for different colors (CMYK), each paired or mated with a different OPC drum. For instance, a cyan developer unit may be mated with a first OPC drum, a magenta developer unit may comprise a second OPC drum, a yellow developer unit may comprise a third OPC drum, and a black developer unit may comprise a fourth OPC drum. Each OPC drum may comprise a different human-indiscernible hardware-based identifier that may be embodied in a latent image on the respective OPC drums and transferred to intermediate transfer belt 555, and represented by latent image 575b. Sensor 520b may detect the latent image, such as represented by arrow C. It is noted that in yet other implementations, developer units may be separate from drum units comprising an OPC drum. Therefore, the foregoing is not to be taken in a limiting sense.

As shall be discussed hereinafter, the detected latent image (e.g., latent image 575a or 575b) may be used for authentication of a consumable component, among other things.

Figure 6:
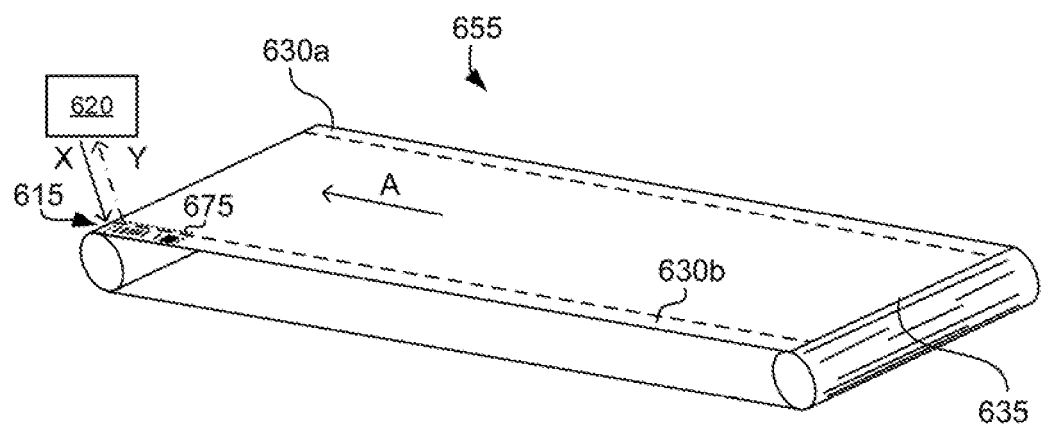
FIG. 6 is a perspective view of an example system for detecting a human-indiscernible hardware-based identifier.

Turning to FIG. 6, a perspective view of an example intermediate transfer belt 655 is illustrated, showing peripheral portions 630a and 630b thereof (in contrast to imaging portion 635). There may be an interest in, for example, arranging a human-indiscernible identifier so that it is on a portion of intermediate transfer belt 655 that is not to contact print media (e.g., peripheral portion 630b). Thus, for example, by arranging human-indiscernible hardware-based identifier 215 of FIG. 2 in peripheral portion 230a of FIG. 2, a latent image of the human-indiscernible hardware-based identifier 215 may transfer into peripheral portion 630b in FIG. 6, and as illustrated by latent image 675. In this example, print media may come into contact with imaging portion 635 and latent images may be transferred to the print media without necessarily transferring latent image 675 to the print media.

As intermediate transfer belt 655 travels, as shown by arrow A, latent image 675 embodying a human-indiscernible hardware-based identifier 615 may move into proximity of sensor 620, which may be able to detect latent image 675 (and human-indiscernible hardware-based identifier 615). An example is illustrated in which sensor 620 is a photo transceiver and transmits EMR, represented by line X, and receives reflected radiation, represented by dash-dot line Y.

Figure 7:
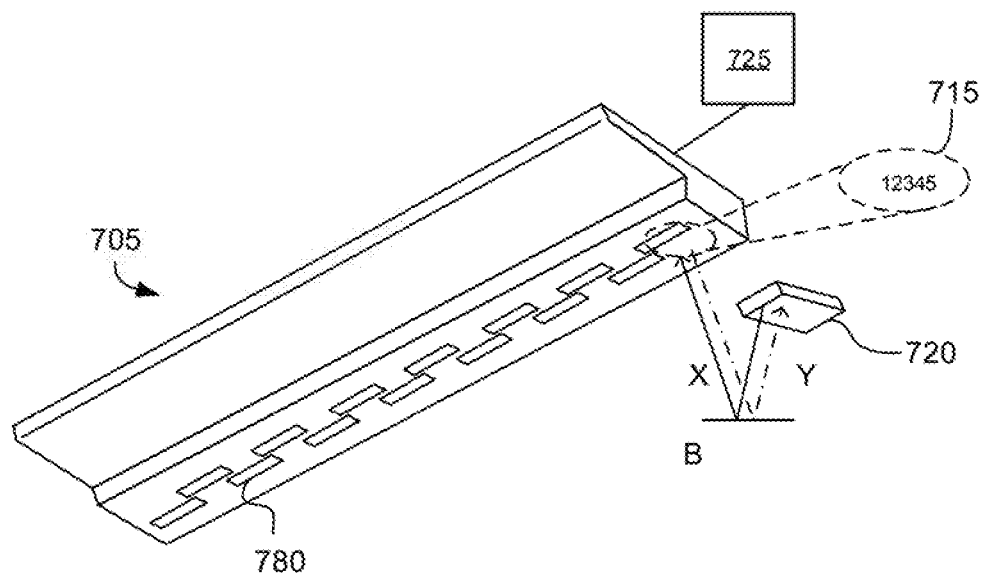
FIG. 7 is a perspective view of another example system for detecting a human-indiscernible hardware-based identifier.

As noted above, there may be an interest in using human-indiscernible hardware-based identifiers with consumable components in other contexts. For example, an additional implementation may include with regards to a printbar 705 is illustrated in FIG. 7 (e.g., comprising an array of printheads, such as printhead 780). In this example, human-indiscernible hardware-based identifier 715 may comprise a pattern, such as of alphanumeric characters, that may not be readily discernible to humans without the use of a vision apparatus (e.g., microscope, IR detector, etc.).

Human-indiscernible hardware-based identifier 715 may be arranged on printbar 705 to allow detection by a sensor 720. In one example, sensor 720 may be capable of detecting human-indiscernible hardware-based identifier 715 directly, such as analogously to an OPC drum as discussed, above. However, in another case, detecting human-indiscernible hardware-based identifier 715 may be possible by reflecting EMR off another surface. For instance, FIG. 7 illustrates an optical transceiver implementation in which EMR from sensor 720 may be reflected off a surface B. Surface B may be in a number of possible locations, such as to allow detection of human-indiscernible hardware-based identifier 715. For instance, surface B may comprise a reflective surface of a media conveyance path under printbar 705, such as may be visible in gaps between sheets of media.

Printbar 705 may also comprise a computer-readable medium 725, such as may have signals or states stored thereon and that may be usable to enable authentication of printbar 705, consistent with the foregoing discussion of FIGS. 1A-6.

As discussed above, there may be interest in using a human-indiscernible hardware-based identifier (e.g., human-indiscernible identifier 115 in FIG. 1) to authenticate a consumable component (e.g., consumable component 105 in FIG. 1). FIG. 8 illustrates an example print device 800 comprising a consumable component 805. As noted, example consumable components may include an OPC drum, a print bar, and a cartridge, by way of non-limiting example. Consumable component 805 may include a human-indiscernible hardware-based identifier. The human-indiscernible hardware-based identifier may be detected, such as consistent with the above description, using a sensor 820. Signals from sensor 820 and indicative of the human-indiscernible hardware-based identifier may be transmitted to a processor 802. Sensor 820 may be capable of generating signals, such as binary digital signals, embodying a detected human-indiscernible hardware-based identifier. Of course, other types of signals are contemplated by the claimed subject matter including, but not limited to, analog signals, optical signals, and the like.

As used herein, processor 802 refers to a logic processor or controller that interprets and executes instructions, such as instructions 827. Processors 802 may comprise an IC having multiple circuit elements including transistors, and that may enable the interpretation and execution of instructions, such as with the assistance of software and/or firmware. Illustrative examples of processor 802 may include, but not be limited to, general processing resources, specific processing resources, controllers, application-specific ICs (ASICs), and field-programmable gate arrays (FPGAs), by way of example.

Non-transitory computer-executable instructions 827 may be stored in a computer readable medium of print device 800. Example instructions may include, for example, instructions to enable authentication of consumable components. FIGS. 9 and 10 discuss example methods (methods 900 and 1000, respectively), which may be enable by executing instructions 827 stored in computer-readable medium 825. In one case, for example, signals representative of a human-indiscernible hardware-based identifier may be used by processor 802 along with signals or states from a computer-readable medium of a consumable component (e.g., computer-readable medium 225 from FIG. 2) for authentication of the consumable component.

By way of non-limiting example, in one implementation, print device 800 may comprise a processor 802 that may receive signals indicative of a human-indiscernible hardware-based identifier. Processor 802 also may receive signals from a non-transitory computer-readable medium arranged on a consumable component 805 (e.g., an OPC drum, such as OPC drum 205 in FIG. 2). Processor 802 may compare the signals indicative of the human-indiscernible hardware-based identifier with the signals from the non-transitory computer-readable medium. In response to the comparison, processor 802 may alter an operation of print device 800. For instance, in one case, processor 802 may alter the operation of print device 800 in response to a determination that the human-indiscernible hardware-based identifier does not correspond to the signals from the non-transitory computer-readable medium. In another case, processor 802 may alter an operation of print device 800 in response to a determination that a consumable component 805 has one or more attributes to take advantage for which different operation may be desired (e.g., changes in voltage applied based on different materials, throughput, etc.).

FIG. 9 illustrates one example method 900 for detecting a human-indiscernible hardware-based identifier. As noted above, detecting a human-indiscernible hardware-based identifier (e.g., human-indiscernible hardware-based identifier 115 in FIG. 1B) may comprise detecting the human-indiscernible hardware-based identifier arranged on a consumable component (e.g., consumable component 105 in FIG. 1B) of a print device (e.g., print device 100 in FIG. 1B) using a sensor (e.g., sensor 120) of the print device. Signals representative of the detected human-indiscernible hardware-based identifier may be transmitted to a processor (e.g., processor 802 in FIG. 8) of the print device.

At block 905, a human-indiscernible hardware-based identifier may be detected, such as discussed above. For example, in the case of a human-indiscernible hardware-based identifier arranged on an OPC drum, such as OPC drum 205 in FIG. 2, detection may comprise using a sensor arranged in proximity to the OPC drum. The sensor may therefore be able to detect a latent image representing the human-indiscernible hardware-based identifier on the surface of the OPC drum. Alternatively, a sensor may be arranged in proximity to an intermediate transfer belt, and the sensor may be able to detect a latent image representing the human-indiscernible hardware-based identifier on the surface of the intermediate transfer belt.

As has been described, detecting the human-indiscernible hardware-based identifier may comprise sensing a latent image thereof, sensing the human-indiscernible hardware-based identifier directly (e.g., such as for identifiers printed in a material that is responsive to non-visible EMR, like IR EMR), sensing reflections of human-indiscernible hardware-based identifiers and also reflections of latent images thereof, by way of non-limiting example.

At block 910, signals representative of a human-indiscernible hardware-based identifier may be transmitted, such to a processor, as discussed above. A sensor (e.g., sensor 820 of FIG. 8), that detects a human-indiscernible hardware-based identifier may generate signals representative of the identifier. For example, the signals may encode an image of the human-indiscernible hardware-based identifier in binary digital signals, by way of illustration. And the signals may be transmitted from the sensor, such as to a processor (e.g., processor 802 in FIG. 8). Hereinafter in conjunction with FIG. 10, one possible use of the signals representative of a human-indiscernible hardware-based identifier will be discussed.

For instance, there may be an interest in altering an operation of a print device based on the received signals. If the signals indicate that the consumable component is not authentic and/or cannot be otherwise authenticated, then there may be an interest in notifying a user that a consumable component that may cause damage to the print device (or may otherwise function in undesirable ways) has been installed. In another case, there may be an interest in putting the print device in a safe mode of operation, such as reducing engine speed, conducting tests of color registration more frequently than they may be performed in normal operation, etc. In contrast, at other times there may be a desire to adjust print operation to take advantage of consumable component characteristics, such as discussed above. On the other hand, in response to signals indicative of an authentic consumable component, the print device may alter an end-of-life prediction for the print device. If, for example, the print device was previously operating in a mode other than a normal mode of operation, then the mode of operation may be altered to place the print device in a normal mode of operation. Turning to FIG. 10, it illustrates a method 1000 for altering an operation of a print device.

At block 1005, and consistent with the foregoing discussion, EMR may be transmitted from a sensor (e.g., sensor 820 in FIG. 8), such as to a region of a consumable component in which a human-indiscernible identifier may be expected to be found, by way of example. By way of illustration, as discussed in FIGS. 2 and 6, there may be regions on a consumable component in which a human-indiscernible identifier may be found. Arranging human-indiscernible identifiers in peripheral portions of consumable components may be of interest, such as to avoid interfering with marking a print medium. In another implementation, however, a latent image of a human-indiscernible hardware-based identifier may be transferred to print media, such as in a manner as to be imperceptible to humans. In any case, the sensor may transmit EMR to detect the human-imperceptible identifier.

At block 1010, reflected EMR may be received by a sensor. In one case, the sensor may comprise an optical transceiver, and may thus be capable of receiving the reflected EMR, which may be indicative of a human-indiscernible hardware-based identifier. The received EMR may enable generation of signals, such as binary digital signals, representing the human-indiscernible hardware-based identifier.

At block 1015, the signals representative of the human-indiscernible identifier may be transmitted, such as to a processor (e.g., processor 802). In addition, in one example case, signals may be received at the processor from a computer-readable medium of the consumable component, such as computer-readable medium 225 in FIG. 2. The signals received from the computer-readable medium may embody an identifier, such as may be stored in the computer-readable medium as a signal or a state. The signals received from the sensor may be compared with the signals received from the computer-readable medium. In one case, the signals may not correspond, potentially suggesting that the consumable component is not authentic, and therefore, may not be of a satisfactory quality. In another case, the signals may correspond, and the print device may determine that the consumable component is authentic.

It is noted that the information stored, either as a human-indiscernible hardware-based identifier or on a computer-readable medium of a consumable component, may be used for other purposes. For instance, the information may allow the print device to determine whether the particular consumable component is subject to a recall, in response to which, there may be an interest in conveying relevant information to the user, service representative, and/or manufacturer. In another example use of stored information, printing operation may be varied based on attributes of a consumable component (such as may be indicated by a portion of an identifier). Of course, other uses of the information are contemplated by the claimed subject matter. The foregoing are merely examples.

Returning to example method 1000, at block 1020, an operation of a print device may be altered based on the signals received at the processor. As noted above, this may include providing alerts to users, such as in the form of user interface prompts on a display of the print device. Altering the operation of the print device may also include placing the print device in a mode of operation that will increase a likelihood of protecting the print device from damage due to a consumable component of an unknown source and/or quality.

As should be apparent from the foregoing, therefore, there may be an interest in arranging a human-indiscernible hardware-based identifier on a consumable component, on detecting the human-indiscernible hardware-based identifier, and authenticating the consumable component based on the detected identifier.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A print device comprising:
   a consumable component comprising a human-indiscernible hardware-based identifier;
   an intermediate transfer belt; and
   a sensor to read the human-indiscernible hardware-based identifier, wherein the sensor is arranged proximate to the intermediate transfer belt to detect a latent image of the human-indiscernible hardware-based identifier on the intermediate transfer belt.

2. The print device of claim 1, wherein the human-indiscernible hardware-based identifier is arranged such as to not interfere with marking a print medium.

3. The print device of claim 1, wherein the human-indiscernible hardware-based identifier is etched in a surface of the consumable component.

4. The print device of claim 3 further comprising an undercoat layer deposited over the etched human-indiscernible hardware-based identifier.

5. The print device of claim 4 further comprising a photoconductive layer arranged over the undercoat layer.

6. The print device of claim 1, wherein the human-indiscernible hardware-based identifier is arranged on a peripheral portion of the consumable component such that the latent image of the human-indiscernible hardware-based identifier is on a portion of the intermediate transfer belt that is not to contact print media.

7. A method comprising:
   detecting a human-indiscernible hardware-based identifier arranged on a consumable component of a print device using a sensor of the print device, comprising:
      transmitting electromagnetic radiation (EMR) from the sensor, the sensor comprising a photo transceiver; and
      receiving reflected EMR at the sensor; and
   transmitting signals representative of the detected human-indiscernible hardware-based identifier to a processor of the print device.

8. The method of claim 7, wherein the transmitting of the EMR comprises transmitting the EMR to a portion of an intermediate transfer belt of the print device.

9. The method of claim 7 further comprising altering an operation of the print device in response to reception by the processor of the transmitted signals representative of the detected human-indiscernible hardware-based identifier.

10. The method of claim 9, wherein the altering of the operation of the print device comprises altering an end-of-life prediction for the consumable component.

11. The method of claim 9, wherein the altering of the operation of the print device comprises providing information via a user interface of the print device.

12. The method of claim 7, wherein the transmitting the EMR comprises transmitting the EMR towards a printbar.

13. A print device comprising:
   an organic photoconductor (OPC) drum comprising a unique human-indiscernible hardware-based identifier arranged in a peripheral portion of the OPC drum;
   an intermediate transfer belt to receive a latent image from the peripheral portion of the OPC drum, the latent image corresponding to the human-indiscernible hardware-based identifier; and
   a sensor to read the latent image and enable authentication of the OPC drum based thereon.

14. The print device of claim 13 further comprising a processor, the processor to:
   receive signals indicative of the human-indiscernible hardware-based identifier; and
   receive signals from a non-transitory computer-readable medium arranged on the OPC drum.

15. The print device of claim 14, wherein the processor is further to compare the signals indicative of the human-indiscernible hardware-based identifier with the signals from the non-transitory computer-readable medium.

16. The print device of claim 15, wherein the processor is further to alter an operation of the print device in response to a determination that the human-indiscernible hardware-based identifier does not correspond to the signals from the non-transitory computer-readable medium.

* * * * *